(12) United States Patent
Mantin et al.

(10) Patent No.: US 8,818,019 B2
(45) Date of Patent: Aug. 26, 2014

(54) ROBUST WATERMARK

(75) Inventors: Itsik Mantin, Shoham (IL); Aviad Kipnis, Efrat (IL)

(73) Assignee: Cisco Technology Inc, San Jose, CA (US)

( * ) Notice: Subject to any disclaimer, the term of this patent is extended or adjusted under 35 U.S.C. 154(b) by 468 days.

(21) Appl. No.: 13/376,394

(22) PCT Filed: Dec. 16, 2009

(86) PCT No.: PCT/IB2009/055776
§ 371 (c)(1),
(2), (4) Date: Feb. 1, 2012

(87) PCT Pub. No.: WO2010/143026
PCT Pub. Date: Dec. 16, 2010

(65) Prior Publication Data
US 2012/0128200 A1   May 24, 2012

(30) Foreign Application Priority Data

Jun. 8, 2009   (IL) .......................................... 199240

(51) Int. Cl.
*G06K 9/00* (2006.01)
*H04N 21/2389* (2011.01)
*G06T 1/00* (2006.01)
*H04N 21/8355* (2011.01)
*H04N 21/8358* (2011.01)
*H04N 7/167* (2011.01)

(52) U.S. Cl.
CPC ....... *H04N 7/1675* (2013.01); *H04N 21/23892* (2013.01); *G06T 1/0021* (2013.01); *H04N 21/8355* (2013.01); *H04N 21/8358* (2013.01)
USPC ...................................................... 382/100

(58) Field of Classification Search
None
See application file for complete search history.

(56) References Cited

U.S. PATENT DOCUMENTS

| 6,507,299 B1 | 1/2003 | Nuijten |
| 6,539,475 B1 | 3/2003 | Cox et al. |

(Continued)

FOREIGN PATENT DOCUMENTS

| GB | 2 419 489 B | 2/2007 |
| JP | 2004-242162 | 8/2004 |

(Continued)

OTHER PUBLICATIONS

International Search Report from the European Patent Office in International Application No. PCT/IB2009/055776 mailed Sep. 29, 2010.

(Continued)

*Primary Examiner* — Jayesh A Patel
*Assistant Examiner* — Iman K Kholdebarin
(74) *Attorney, Agent, or Firm* — Husch Blackwell LLP (57) ABSTRACT

A method and system for embedding a watermark in block encrypted content, including encoding a bit string, the bit string including n bits, denoted $b_0$-$b_{n-1}$, the encoding including translating each bit, $b_0$-$b_{n-1}$, into a block of data, according to the following rule if $b_i=1$, then translate $b_i$ into a block of data of a first type, and if $b_i=0$, then translate $b_i$ into a block of data of a second type, thereby translating the n bits into n blocks of data corresponding to each bit $b_0$-$b_{n-1}$, arranging a composite block of data including the n blocks of data, and at least one additional block indicating the presence of the n blocks of data, and inserting the composite block of data into a content item as a watermark, wherein the watermarked content item is encrypted using an ECB mode of encryption. Related methods and apparatus are also described.

8 Claims, 9 Drawing Sheets

(56) References Cited

U.S. PATENT DOCUMENTS

| | | | |
|---|---|---|---|
| 6,865,747 | B1 | 3/2005 | Mercier |
| 7,263,204 | B2 | 8/2007 | Kim et al. |
| 7,319,775 | B2 | 1/2008 | Sharma et al. |
| 7,886,152 | B2 | 2/2011 | Neubauer et al. |
| 7,920,713 | B2 | 4/2011 | Wells et al. |
| 7,983,441 | B2 | 7/2011 | Vestergaard et al. |
| 8,205,076 | B1 * | 6/2012 | Shetty et al. ............. 713/160 |
| 8,256,005 | B2 * | 8/2012 | Lerouge et al. ............. 726/26 |
| 8,340,348 | B2 * | 12/2012 | Petrovic et al. ............. 382/100 |
| 8,416,983 | B1 * | 4/2013 | Joseph ............. 382/100 |
| 8,542,825 | B2 * | 9/2013 | Whillock et al. ............. 380/43 |
| 8,549,307 | B2 * | 10/2013 | Winograd ............. 713/176 |
| 8,615,104 | B2 * | 12/2013 | Petrovic et al. ............. 382/100 |
| 2004/0032967 | A1 | 2/2004 | Kim et al. |
| 2005/0259820 | A1 | 11/2005 | Jones |
| 2006/0133644 | A1 | 6/2006 | Wells et al. |
| 2007/0110237 | A1 * | 5/2007 | Tehranchi et al. ............. 380/201 |
| 2008/0101604 | A1 | 5/2008 | Kocher et al. |
| 2008/0187134 | A1 * | 8/2008 | Nourry et al. ............. 380/29 |
| 2009/0034715 | A1 | 2/2009 | Ramasamy et al. |

FOREIGN PATENT DOCUMENTS

| | | | |
|---|---|---|---|
| WO | WO 2006/091304 | A2 | 8/2006 |
| WO | WO 2008/052141 | A2 | 5/2008 |

OTHER PUBLICATIONS

ITU-T, "Series H: Audiovisual and Multimedia Systems Infrastructure of audiovisual services—Coding of moving video, Advanced video coding for generic audiovisual services", ITU-T Telecommunication Standardization Sector of ITU, H.264, pp. 1, 9, 13, 58-66, 308, 309, and 321, (Nov. 2007).

SMPTE Draft Standard for Television, "Proposed SMPTE Standard for Television: VC-1 Compressed Video Bitstream Format and Decoding Process", SMPTE Technology Committee C24 on Video Compression Technology, pp. 1, 446, 447 and 453-458, (Aug. 23, 2005).

John Wiley & Sons, Inc., "Algorithm Types and Modes", Applied Cryptography, Second Edition, Protocols, Algorithm and Source Code in C, pp. 1-2 and 189-193, 208 and 209, (1996).

Menezes, et al., "Handbook of Applied Cryptography", Chapter 7.2 Background and general concepts, pp. 1, 229-230, (1997).

ISO/IEC, "Information technology—Generic coding of moving pictures and associated audio information: Systems", International Standard, Second Edition, ISO/IEC 13818-1:2000(E), pp. i-xvii, 1-155, (Dec. 1, 2000).

ISO/IEC, "Information technology—Generic coding of moving pictures and associated audio information: Video", International Standard, Second Edition, ISO/IEC 13818-2:2000(E), pp. i-x, 1-209, (Dec. 15, 2000).

Extended Search Report from the European Patent Office in corresponding Application No. EP 11 19 1608 dated Apr. 4, 2012.

* cited by examiner

ROBUST WATERMARK

CROSS REFERENCE TO RELATED APPLICATIONS

The present application is a 35 USC §371 application of PCT/IB2009/055776, filed on Dec. 16, 2009 and entitled "Robust Watermark", which was published in the English language with International Publication Number WO 2010/143026, and which claims the benefit of priority from IL Patent Application IL 199240 of NDS Limited, filed Jun. 8, 2009, the content of all of which is incorporated herein by reference.

BACKGROUND OF THE INVENTION

The following are believed to reflect the state of the art:
US 2005/0259820 of Jones;
US 2004/0032967 of Kim et al.;
U.S. Pat. No. 6,539,475 to Cox et al.; and
PAJ 2004-242162 of Mitsubishi Electric Corp.

The following standards are also believed to be particularly relevant to the present specification and claims:

The International Telecommunication Union (ITU) Standard, *Advanced Video Coding for Generic Audiovisual Services*, ITU-T Rec. H.264 (March/2005), also referred to as either H.264, or alternatively MPEG-4, especially the introduction (section 0), section 3, section 7.4.1; annex D, section D.1.4 and D.2.4; and annex D, section D.1.5 and D.2.5. The aforementioned sections cited of H.264 are hereby incorporated by reference.

ISO/IEC Standard, *Information Technology—Generic Coding of Moving Pictures and Associated Audio Information: Systems*, ISO/IEC 13818-1 (15 Jan. 2000), also referred to as MPEG-2 Video Specification, especially the Introduction and section 2.1. The aforementioned sections cited of the MPEG-2 systems specification are hereby incorporated by reference.

ISO/IEC Standard, *Information Technology—Generic Coding of Moving Pictures and Associated Audio Information: Video*, ISO/IEC 13818-2 (15 Dec. 2000), also referred to as MPEG-2 Video Specification, especially sections 6.2.2.2.2 and 6.3.4.1. The aforementioned sections cited of the MPEG-2 video specification are hereby incorporated by reference.

SMPTE Technology Committee C24 on Video Compression Technology *Proposed SMPTE Standard for Television: VC-1 Compressed Video Bitstream Format and Decoding Process*, SMPTE 421m (23 Aug. 2005), also known as VC-1, especially Annex F and Annex G, section G.7. The aforementioned sections cited of VC-1 are hereby incorporated by reference.

SUMMARY OF THE INVENTION

There is thus provided in accordance with an embodiment of the present invention a method for embedding a watermark in block encrypted content, the method including encoding a bit string, the bit string including n bits, denoted $b_0$-$b_{n-1}$, the encoding including translating each bit, $b_0$-$b_{n-1}$, into a block of data, according to the following rule if $b_i=1$, then translate $b_i$ into a block of data of a first type, and if $b_i=0$, then translate $b_i$ into a block of data of a second type, thereby translating the n bits into n blocks of data corresponding to each bit $b_0$-$b_{n-1}$, arranging a composite block of data including the n blocks of data, and at least one additional block indicating the presence of the n blocks of data, and inserting the composite block of data into a content item as a watermark, wherein the watermarked content item is encrypted using an ECB mode of encryption.

Further in accordance with an embodiment of the present invention the composite block of data includes at least one instance of the block of data of the first type, and the n blocks of data.

Still further in accordance with an embodiment of the present invention and further including prefixing a header to the composite block of data, the header including a plurality of a repeated block of data of a third type, thereby creating a prefixed composite block of data, and the inserting includes inserting the prefixed composite block into the content item.

Additionally in accordance with an embodiment of the present invention wherein the content includes block encrypted content.

Moreover in accordance with an embodiment of the present invention the content includes at least one of video content, audio content, and a still image.

Further in accordance with an embodiment of the present invention the bit string includes unique identification data.

Still further in accordance with an embodiment of the present invention the unique identification data includes a subscriber ID.

Additionally in accordance with an embodiment of the present invention the unique identification data includes a smart card ID.

Moreover in accordance with an embodiment of the present invention the inserting includes inserting the prefixed composite block of data between a first portion of the content item and a second portion of the content item.

Further in accordance with an embodiment of the present invention the inserting includes inserting the watermark into a user data structure inserted between the first portion of the content item and the second portion of the content item.

Still further in accordance with an embodiment of the present invention the inserting includes inserting the watermark into a network abstraction layer structure of unspecified type inserted between the first portion of the content item and the second portion of the content item.

There is also provided in accordance with another embodiment of the present invention a method for detecting a watermark in watermarked content, the method including obtaining an encrypted content item, the encrypted content item being encrypted using an electronic codebook (ECB) mode of encryption, and including an encoded bit string, locating a prefix in the encrypted content item, the prefix including a repeated plurality of blocks of data of a first type, locating, after the prefix, a composite block of data, the composite block of data including at least one instance of a block of data of a second type, and a plurality of translated blocks of data, translating the plurality of translated blocks of data into a bit string according to the following rule if a block to be translated includes a block of data of the second type then translate the block of data into a bit $b_i$ equal to 1, and if the block to be translated includes a block of data of the third type then translate the block of data into a bit $b_i$ equal to 0, arranging the bit string so that for i=0-n−1, the bit string is arranged as $b_0$-$b_{n-1}$, thereby determining the encoded bit string.

There is also provided in accordance with still another embodiment of the present invention method for embedding a watermark in block encrypted content, the method including providing an MPEG packet, the MPEG packet including a payload, dividing the payload into N blocks of equal size, each block denoted as one of $b_0$-$b_{n-2}$, and $b_x$, determining $b_0 \oplus \ldots \oplus b_{n-2} = B$ providing a byte, denoted A, in an MPEG header, A being an adaptation field including proprietary parameters, encrypting, according to an encryption function f, $f(b_x, B, A)$, where B includes an encryption key for the encryption function f, performing at least one of encrypting $b_x$ according to a modified key, $B \oplus A$, and selecting a value k, where $0 \le k < 32$, searching for a value of A for a predicate P such that $P_k(Y)$ for Y, a 16 byte long vector, and the encrypted value of $b_x$ contains information about the watermark $k^{th}$ bit, where Y includes an encrypted value of $b_x$.

Further in accordance with an embodiment of the present invention Y is calculated as follows setting A=1, and incrementally performing the following steps in a loop determining $Y = f(b_x, B, A)$, determining if $P_k(Y)$=The $k^{th}$ bit of the watermark, if $P_k(Y)$=the $k^{th}$ bit of the watermark then setting Y=an encrypted value of $b_x$, if $P_k(Y)!$=the $k^{th}$ bit of the watermark then if a loop index has exceeded a predetermined upper bound, setting A=0, and stopping the loop and processing another MPEG packet, and if the loop index has not exceeded a predetermined upper bound, incrementing A and repeating the determining of Y in the loop.

Still further in accordance with an embodiment of the present invention the predicate P includes a secret value.

Additionally in accordance with an embodiment of the present invention the predicate P includes a content dependent predicate.

Moreover in accordance with an embodiment of the present invention when A=0, utilizing regular encryption.

There is also provided in accordance with still another embodiment of the present invention a system for embedding a watermark in block encrypted content, the system including a bit string including n bits, denoted $b_0$-$b_{n-1}$, the bit string including an encoded bit stream, the encoded bit string including each bit, $b_0$-$b_{n-1}$ translated into a block of data, according to the following rule if $b_i$=1, then translate $b_i$ into a block of data of a first type, and if $b_i$=0, then translate $b_i$ into a block of data of a second type, the n bits of the bit stream thereby being translated into n blocks of data corresponding to each bit $b_0$-$b_{n-1}$, a composite block of data including the n blocks of data, and at least one additional block indicating the presence of the n blocks of data, and a content item into which the composite block of data has been inserted as a watermark, wherein the watermarked content item is encrypted using an ECB mode of encryption.

There is also provided in accordance with still another embodiment of the present invention a system for detecting a watermark in watermarked content, the system including an encrypted content item, the encrypted content item being encrypted using an electronic codebook (ECB) mode of encryption, and including an encoded bit string, a prefix located in the encrypted content item, the prefix including a repeated plurality of blocks of data of a first type, a composite block of data located after the prefix, the composite block of data including at least one instance of a block of data of a second type, and a plurality of translated blocks of data, the plurality of translated blocks of data being translated into a bit string according to the following rule if a block to be translated includes a block of data of the second type then translate the block of data into a bit $b_i$ equal to 1, and if the block to be translated includes a block of data of the third type then translate the block of data into a bit $b_i$ equal to 0, for i=0-n−1, the bit string is arranged as $b_0$-$b_{n-1}$, thereby determining the encoded bit string.

There is also provided in accordance with still another embodiment of the present invention a system for embedding a watermark in block encrypted content, the system including an MPEG packet including a payload, the payload being divided into N blocks of equal size, each block denoted as one of $b_0$-$b_{n-2}$, and $b_x$, a processor which determines $b_0 \oplus \ldots \oplus b_{n-2}$=B a byte, denoted A, in an MPEG header, A being an adaptation field including proprietary parameters, according to an encryption function f, operative to encrypt according to $f(b_x, B, A)$, where B includes an encryption key for the encryption function f, wherein at least one of the following is performed during encryption $b_x$ is encrypted according to a modified key, $B \oplus A$, and for a value k, where $0 \le k < 32$, a value of A is selected for a predicate P such that $P_k(Y)$ for Y, a 16 byte long vector, and the encrypted value of $b_x$ contains information about the watermark $k^{th}$ bit, where Y includes an encrypted value of $b_x$.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
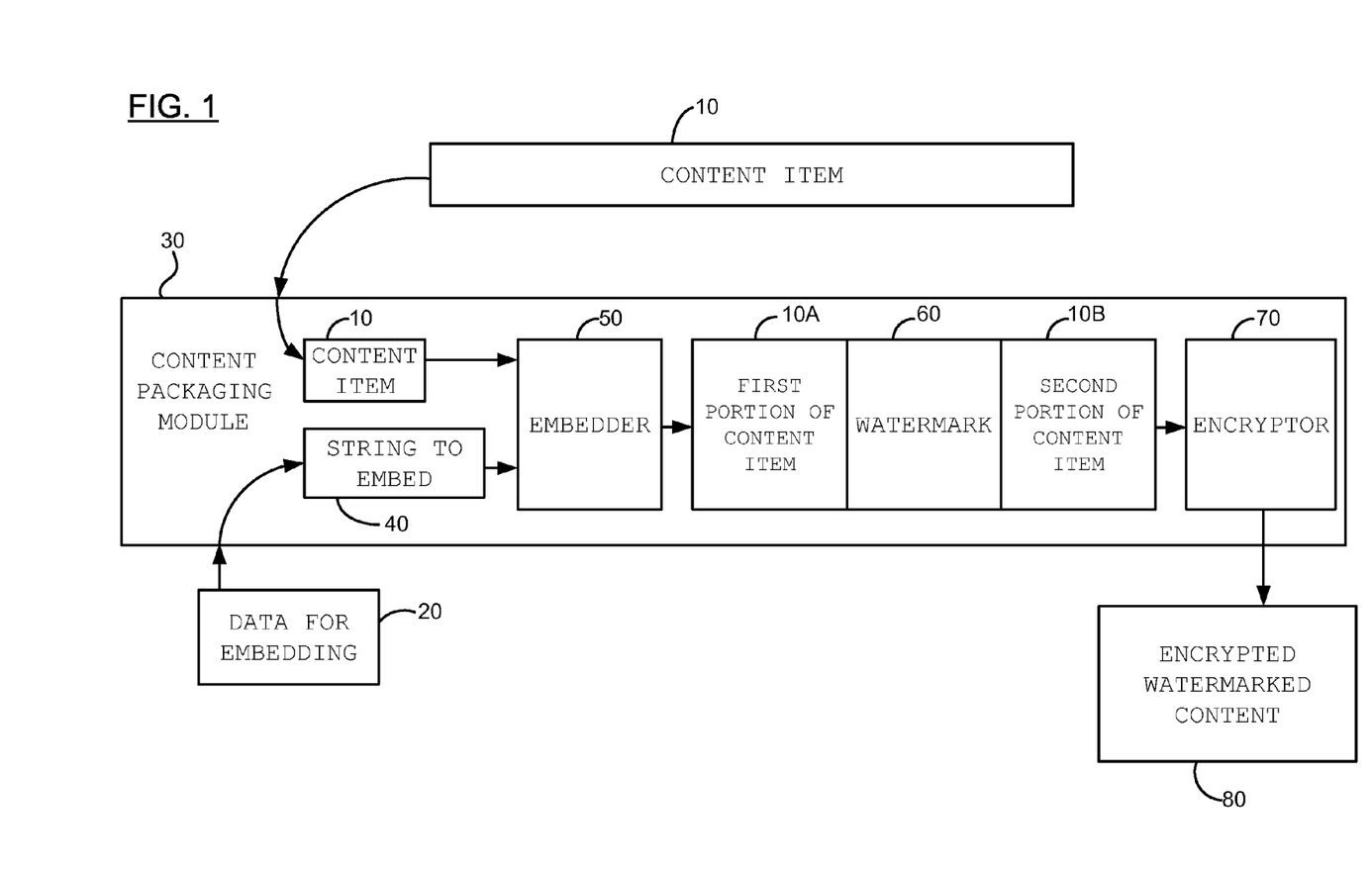
FIG. 1 is a simplified block diagram illustration of a robust watermarking system constructed and operative in accordance with an embodiment of the present invention.

Reference is now made to FIG. 1 which is a simplified block diagram illustration of a robust watermarking system constructed and operative in accordance with an embodiment of the present invention. The system of FIG. 1 comprises a content item 10, a string to embed 40 in the content item 10, and a content packaging module 30. The content packaging module 30 comprises an embedder 50.

The operation of the system of FIG. 1 is now described. The content item 10 is input into the content packaging module 30. Data for embedding 20 as a portion of a watermark is also input into the content packaging module 30. The data for embedding 20 is expressed as a binary string to embed 40. The content item 10 and the string to embed 40 are input into the embedder 50. As described below, the embedder produces a watermark 60 from the string to embed 40 and inserts the watermark 60 between a first portion of the content item 10A and a second portion of the content item 10B. The combined first portion of the content item 10A, watermark 60, and second portion of the content item 10B are input to an encryptor 70. The encryptor 70 outputs encrypted watermarked content 80.

The data for embedding 20 and the corresponding binary string to embed 40 typically comprises unique identification data, the unique identification data typically being data associated with a particular subscriber to a pay for content video system, or other pay for content system. For example and without limiting the generality of the foregoing, the unique identification data may comprise a subscriber ID or a smart card ID, the smart card being associated with a particular a subscriber.

Figure 2:
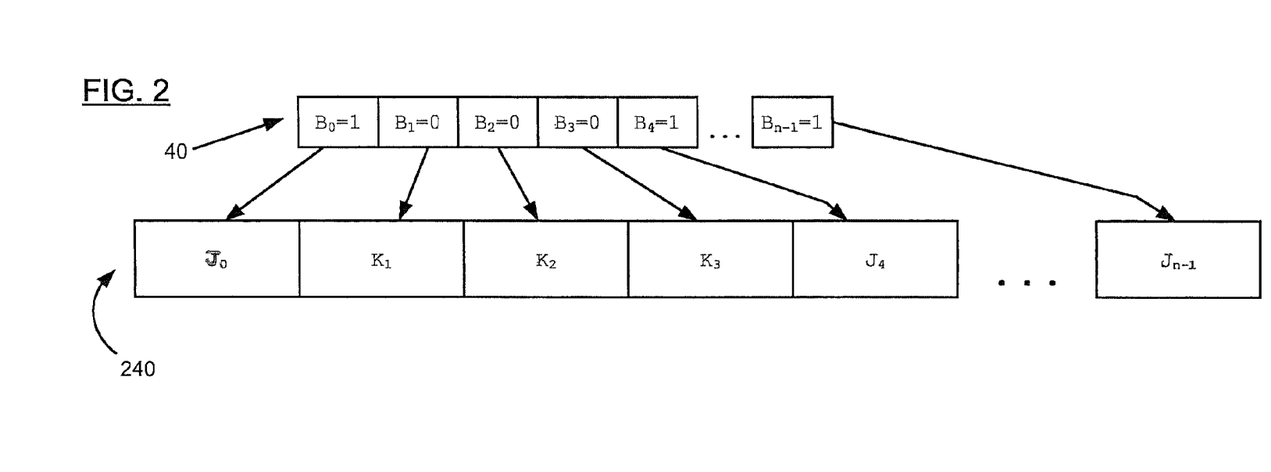
FIG. 2 is a simplified block diagram illustration of a system for translating a string of bits into blocks of data within the robust watermarking system of FIG. 1.

Reference is now made to FIG. 2, which is a simplified block diagram illustration of a system for translating a string of bits into blocks of data within the robust watermarking system of FIG. 1. Those skilled in the art will appreciate that the string to embed 40 is expressed as a string of n bits, denoted $B_0, B_1, B_2, \ldots B_{n-1}$. By way of example, in FIG. 2, $B_0$ is depicted as being 1; $B_1$ is depicted as being 0; $B_2$ is depicted as being 0; $B_3$ is depicted as being 0; $B_4$ is depicted as being 1; ... and $B_{n-1}$ is depicted as being 1. Each bit in the string to embed 40 is translated into a block of data according to the following rule:

if $B_i=1$, then translate $B_i$ into a block of data of a first type, depicted as J in FIG. 2; and if $B_i=0$, then translate $B_i$ into a block of data of a second type, depicted as K in FIG. 2.

Accordingly, in FIG. 2, $B_0$ depicted as being 1 is depicted as being translated into a block of data of a first type, depicted as $J_0$. The following table shows the translation of $B_0, B_1, B_2, \ldots B_{n-1}$ as depicted in FIG. 2:

|  | Bit | | | | | | |
| --- | --- | --- | --- | --- | --- | --- | --- |
|  | $B_0$ | $B_1$ | $B_2$ | $B_3$ | $B_4$ | ... | $B_{n-1}$ |
| Value Depicted in FIG. 2 | 1 | 0 | 0 | 0 | 1 | ... | 1 |
| Translated to, in FIG. 2 | $J_0$ | $K_1$ | $K_2$ | $K_3$ | $J_4$ | ... | $J_{n-1}$ |

It is appreciated, in light of the above table, that $K_1, K_2, K_3, \ldots$ are identical blocks of data. Likewise $J_0, J_4, \ldots, J_{n-1}$ are identical blocks of data.

Alternatively It is also appreciated that a plurality of different patterns may all be used for translating J, and a plurality of different patterns may all be used for translating J. For instance, there might be four types of blocks J and four types of block K. For example and without limiting the generality of the foregoing, if J and K are 32 bits long each, any of the following possible blocks may be $J_a$ or $K_a$, where $J_a$ or $K_a$ indicate on alternative pattern of J or K, as indicated:

| J/K | Value |
| --- | --- |
| $J_{a1}$ | 00000000000000000000000000000000 |
| $J_{a2}$ | 00001000000000000000000000000000 |
| $J_{a3}$ | 00000000100000000000000000000000 |
| $J_{a4}$ | 00000000000000000001000000000000 |
| $K_{a1}$ | 10101010101010101010101010101010 |
| $K_{a2}$ | 11111010101110101010101010101010 |
| $K_{a3}$ | 10101010101010101010101010101111 |
| $K_{a4}$ | 10101010101010111110101010101010 |

It is appreciated that on detection, any of the blocks above are translated into J or K, as appropriate.

As a result, a plurality of translated blocks are aggregated into an incomplete composite block of data 240, comprising a plurality of blocks of data, each of the plurality of blocks of data corresponding to one of the bits of the string to embed 40.

Figure 3:
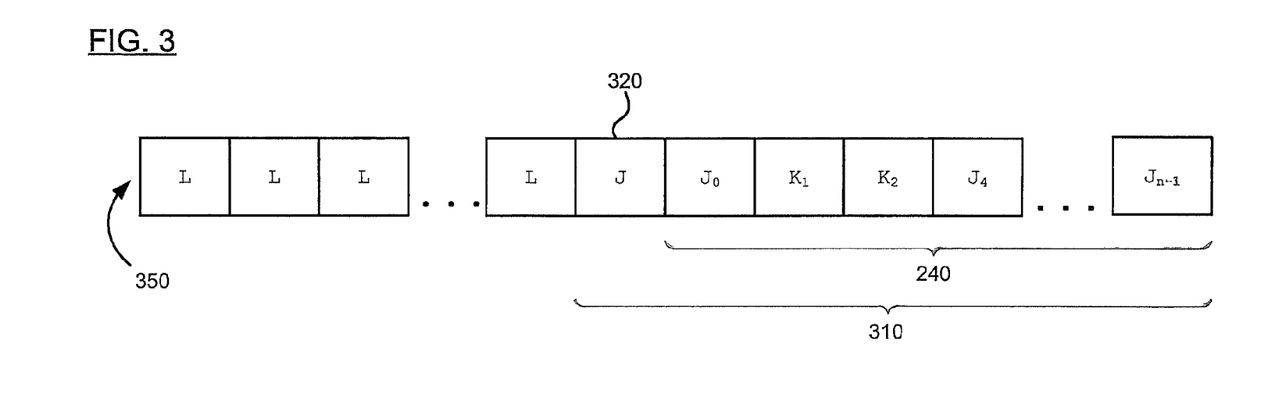
FIG. 3 is a simplified block diagram depiction of a prefixed composite block of data for use in the robust watermarking system of FIG. 1.

Reference is now made to FIG. 3, which is a simplified block diagram depiction of a prefixed composite block of data 310 for use in the robust watermarking system of FIG. 1. The composite block of data 310 is aggregated around the incomplete composite block of data 240, and prefixed with at least one block of data of the first type, J 320. The composite block of data 310 is also prefixed with a plurality of a repeated block of data of a third type, L, thereby creating a prefixed composite block of data 350.

Figure 4:
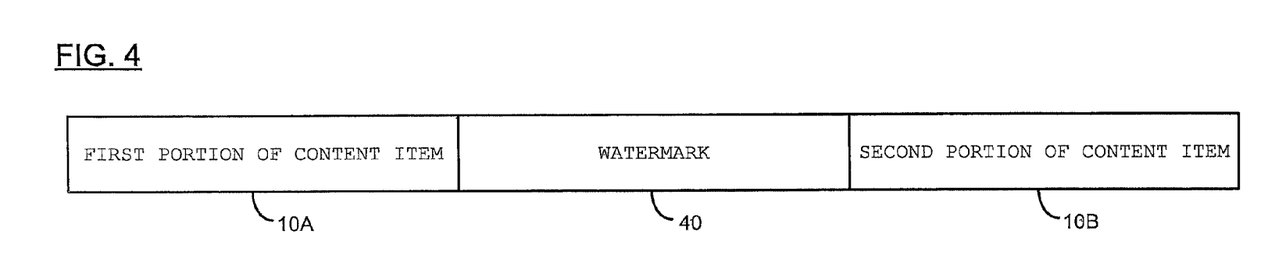
FIG. 4 is a simplified block diagram illustration of a content item comprising the robust watermark of the system of FIG. 1.

Reference is now made to FIG. 4, which is a simplified block diagram illustration of a content item comprising the robust watermark of the system of FIG. 1. The content item is divided into the first portion of the content item 10A and the second portion of the content item 10B. Between the first portion of the content item 10A and the second portion of the content item 10B is inserted the prefixed composite block of data 350 of FIG. 3, depicted here as the watermark 40.

Those skilled in the art will appreciate that the H.264, MPEG-2, and VC-1 standards all describe various structures for user data. Such structures can be used to insert the watermark 40 between the first portion of the content item 10A and the second portion of the content item 10B. Structures for inserting the user data are described in the following locations:

*Advanced Video Coding for Generic Audiovisual Services*, ITU-T Rec. H.264 (March/2005), also referred to as either H.264, or alternatively MPEG-4, especially section 7.4.1; annex D, section D.1.4 and D.2.4; and annex D, section D.1.5 and D.2.5;

*Information Technology—Generic Coding of Moving Pictures and Associated Audio Information: Video*, ISO/IEC 13818-2 (15 Dec. 2005), also referred to as MPEG-2 Video Specification, especially sections 6.2.2.2.2 and 6.3.4.1; and

*Proposed SMPTE Standard for Television: VC-1 Compressed Video Bitstream Format and Decoding Process*, SMPTE 421m (23 Aug. 2005), also known as VC-1, especially Annex F and Annex G, section G.7

Additionally, the H.264 standard specifies a network abstraction layer (NAL) structure. The NAL comprises a nal_unit_type; H.264 Table 7-1 defines nal_unit_type=0 as "Unspecified". Those skilled in the art will appreciate that an unspecified NAL could comprise the watermark 40.

Figure 5:
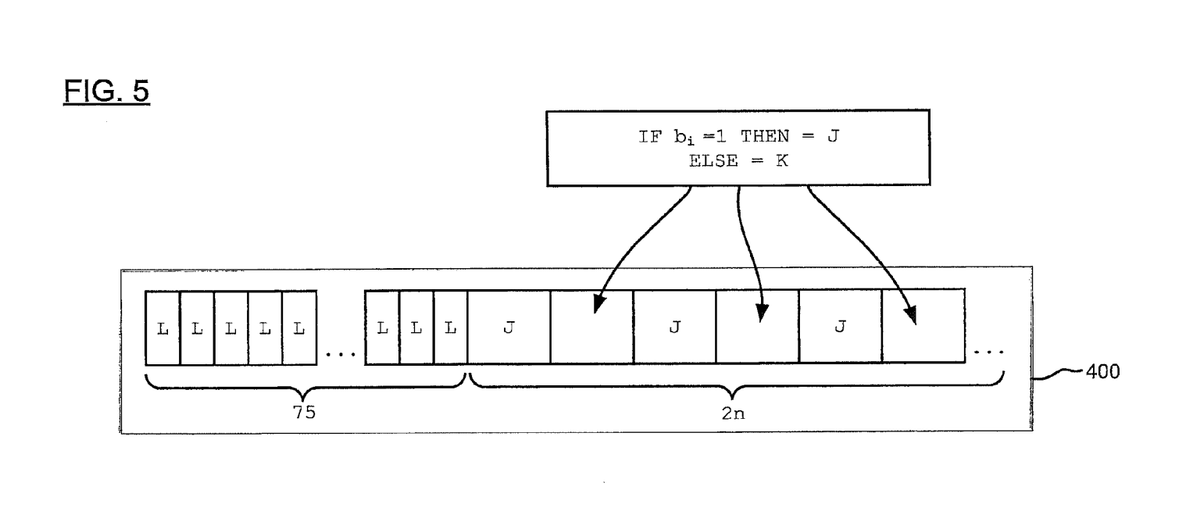
FIG. 5 is a simplified block diagram illustration of one embodiment of the prefixed composite block of data of FIG. 3.
Figure 6:
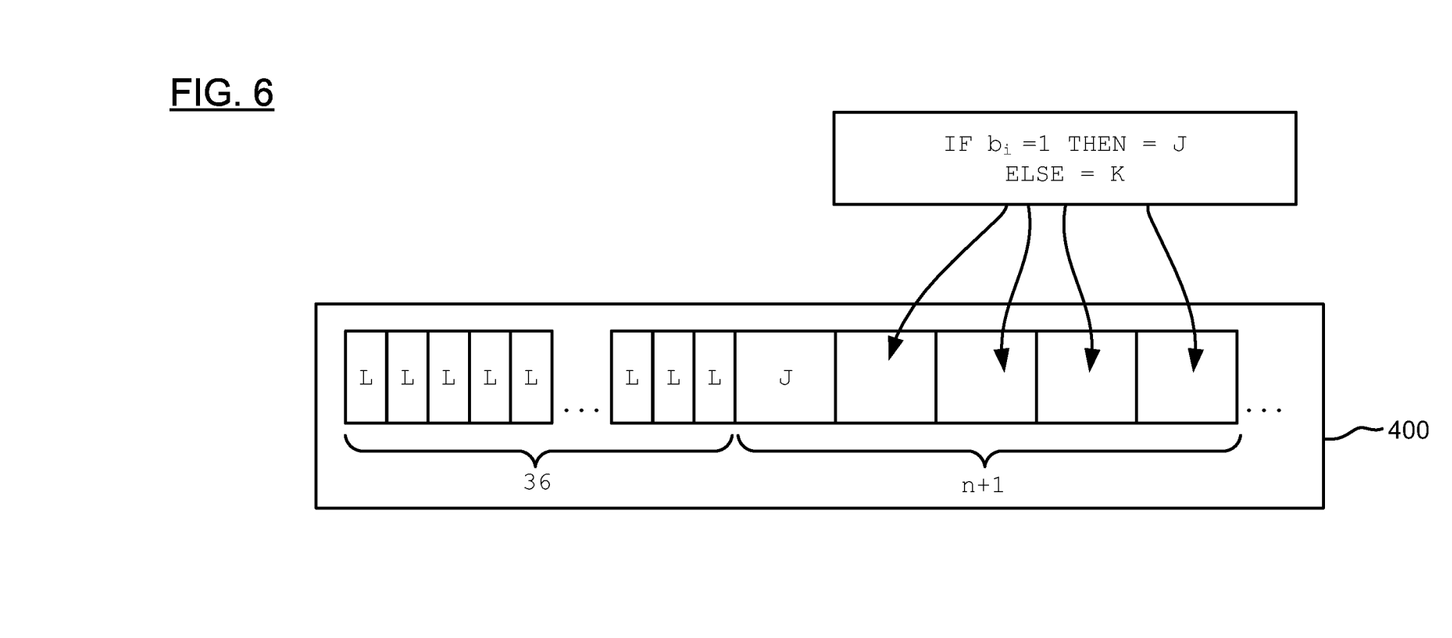
FIG. 6 is a simplified block diagram illustration of an alternative embodiment of the prefixed composite block of data of FIG. 3.

Reference is made to FIGS. 5 and 6. FIG. 5 is a simplified block diagram illustration of one embodiment of the prefixed composite block of data of FIG. 3. FIG. 6 is a simplified block diagram illustration of an alternative embodiment of the prefixed composite block of data of FIG. 3. FIGS. 5 and 6 depict alternative arrangements of blocks in the prefixed composite block of data 400. For example and without limiting the generality of the foregoing, in FIG. 5, each of the data blocks comprising the incomplete composite block of data 240 (FIG. 2) may be interspersed between a block of data of the first type, J. Additionally, by way of example, FIG. 5 depicts the prefix comprising the plurality of the repeated block of data of the third type, L, as comprising 75 repetitions of L.

Alternatively, as an example, FIG. 6 depicts the data blocks comprising the incomplete composite block of data 240 (FIG. 2) as contiguous data blocks. Additionally, by way of example, FIG. 6 depicts the prefix comprising the plurality of the repeated block of data of the third type, L, as comprising 36 repetitions of L.

It is appreciated that the alternative arrangements of blocks in the prefixed composite block of data 400 depicted in FIGS.

5 and 6 are depicted by way of example, and any other appropriate alternative arrangement which is not depicted may also be used.

Figure 7:
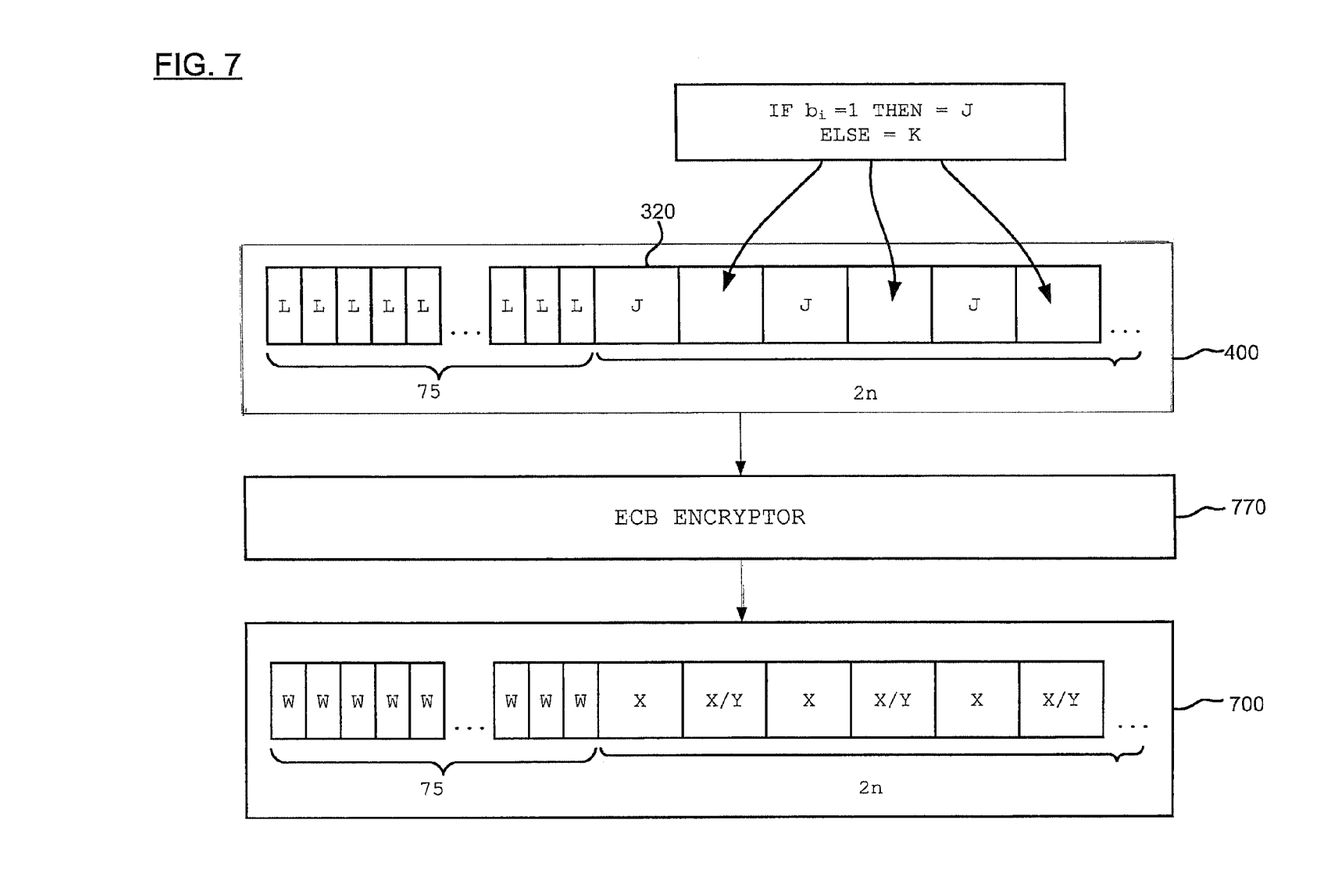
FIG. 7 is a simplified block diagram illustration of the prefixed composite block of data of FIG. 5 encrypted using an electronic codebook (ECB) mode of encryption.

Reference is now made to FIG. 7, which is a simplified block diagram illustration of the prefixed composite block of data of FIG. 5 encrypted using an electronic codebook (ECB) mode of encryption.

It is well known in the art that electronic codebook (ECB) mode of encryption, the simplest encryption mode, a message is divided into blocks, and each block is encrypted separately. ECB, however, encrypts identical plaintext blocks into identical ciphertext blocks. Thus, for instance the plaintext: "We hold these truths to be self-evident, that all men are created equal, that they are endowed by their Creator with certain unalienable Rights", will always be encrypted to produce the same ciphertext, using the same key.

FIG. 7 depicts the prefixed composite block of data 400 of FIG. 5 after the prefixed composite block of data 400 has been encrypted by an ECB encryptor 770 corresponding to the encryptor 70 of FIG. 1. The encrypted prefixed composite block of data 700 comprises an encrypted plurality of the repeated block of data of the third type. Each of the encrypted blocks of data of the third type is depicted as a block W in FIG. 7. The prefix of the at least one block of data of the first type, J 320, is depicted as a block X. Each of the interspersed blocks of data of the first type J, of FIG. 5, are depicted as encrypted as a block X. Each of the blocks which were translated from a bit of value 0 or a bit of value 1 into a data block are depicted, in FIG. 7, as being X/Y, that is to say, a block encrypted either as a block X or as a block Y.

When a content item is isolated and identified as being potentially a content item which was distributed in an unauthorized fashion, the watermark 60 (FIG. 1) is utilized to determine a value of the string of bits which was originally translated into blocks of data (as discussed above, which typically comprises unique identification data, such as, but not limited to, a subscriber ID or a smart card ID) the isolated content item is associated. The watermark is located in a string of bits and bytes comprising the isolated content item as follows:

1. The encrypted plurality of the repeated block of data of the third type (depicted, by way of illustration, as 75 blocks of type W, in FIG. 7) are located.

2. The encrypted at least one block of data of the first type (depicted as a block of type X in FIG. 7) is then located.

3. Regardless of the alternative arrangements of blocks in the prefixed composite block of data 400 (FIGS. 5, 6, and as discussed above, any appropriate alternative arrangements of blocks which is not depicted), once the encrypted at least one block of data of the first type (depicted as a block of type X in FIG. 7) is located, it follows that a block of data which is not a block of data of the first type must, per force, be an encrypted block of data of the second type (depicted as a block of type Y in FIG. 7).

4. Translating blocks of type X into a 1 and translating blocks of type Y into a 0, thereby determining, for each $X_i$ and $Y_i$ a corresponding value of a corresponding bit $B_i$.

5. Once the value of each bit $B_0$-$B_{n-1}$ is determined, the bits are arranged in order, and the string of bits which was originally translated into blocks of data is determined It is appreciated that the description of FIG. 7 is true assuming that each encrypted $B_i$ and encrypted $B_j$ are encrypted according to an identical encryption key. It is the opinion of the inventors of the present invention that in block cipher encryption systems in use at the present time, implementations of the present invention will encrypted $B_i$ and encrypted $B_j$ according to an identical encryption key.

A reader of the watermark can be implemented internally to a content playing device. The content playing device, having received the watermarked content and determined that the content is an unauthorized copy of the content is able to both not decrypt the content and not play the content.

Alternatively, the reader of the watermark can be implemented externally to a content playing device, for instance, a standalone device. For example and without limiting the generality of the foregoing, if a content item is isolated from a secure pirate communications channel, the watermark can be read and the source of the content identified.

Block selection by the reader of the watermark may be performed in any appropriate fashion, including, but not limited to:

Fixed locations: the blocks of data comprising the watermark can be inserted at fixed locations in the content item, either consecutive locations or nonconsecutive locations; and Signaling: the reader of the watermark is signaled that the watermark follows an agreed upon sequence. For example and without limiting the generality of the foregoing, in FIG. 5, the watermark follows 75 blocks of the third type, and in FIG. 6, the watermark follows 36 blocks of the third type.

Those skilled in the art will appreciate that various errors may be introduced into a video stream in during its life cycle. Such errors include, but are not limited to, recompression errors and transmission errors. Accordingly, in some embodiments of the present invention error correction techniques which are well known in the art are applied to the watermark. Since detection of the watermark may, in some embodiments of the present invention, lead to sanctions against a possessor of the content item, it is, therefore, preferable that watermark detection come as close as possible to zero false positives as is reasonable.

Accordingly, the watermark may be encoded with an error detection and/or error correction code, as is well known in the art, in order to ensure that the watermark is correctly read by the reader of the watermark. Alternatively, the watermark may be symmetrically authenticated (for instance using CBC-MAC) or asymmetrically authenticated (for instance using a RSA signature), in order to ensure that the reader of the watermark correctly reads the watermark. Those skilled in the art will appreciate that using either of a symmetric or asymmetric authentication scheme will ensure proper reading of the watermark even when an attacker tries embedding a false watermark in the content.

Those skilled in the art will appreciate that in cases of transcryption, as long as ECB is maintained, the method described herein above is inherently robust, as long as the block size remains the same. The robustness of the method in cases of transcryption applies whether: the same cipher is used with a different key; and a different cipher is used with the same block size. Furthermore, if the block size changes, the method described herein above is also robust to transcryption for cases where an old block size is a whole number multiple of a new block size. It is the opinion of the inventors of the present invention that since the most popular block ciphers in use at the present time utilize a block size which is a multiple of 8 bytes (typically 16 bytes), it is likely that in the most probable of cases are supported by the present invention. Particularly:

When transcrypting to a second cipher which is not the original cipher, the present invention is applicable if the second cipher utilizes a block size which is a divides the block size of the original cipher; and When transcrypting to a second cipher which is not the original cipher, the present invention is applicable if the second cipher utilizes a block size which the block size of the original cipher divided by a whole number.

A possible variation of the present invention is resistant to shifts of data. Each bit in the string to embed 40 (FIG. 1) is translated into a block of data 1000 bits long according to the following rule:

if $B_i=1$, then translate $B_i$ into a block of data of a first type, whereby the first 500 bits of the block of data 1000 bits long are all 0s (zeroes) and the second 500 bits are randomly determined; and if $B_i=0$, then translate $B_i$ into a block of data of a second type whereby the second 500 bits of the block of data 1000 bits long are all 0s (zeroes) and the first 500 bits are randomly determined Thus, any block of 500 zeroes will be detectable to a watermark reader, as described above, since a block of 500 zero bits must include at least 4 8-byte blocks of zeros (or 2 16-byte blocks of zeros), regardless of small shifts in the data. Thus, the reader of the watermark can first locate a sequence of 4 identical blocks and identify a sequence of 4 identical blocks as a prefix of the watermark. The reader of the watermark then locates additional identical blocks, and, upon finding more than eight identical blocks, (1000 zero bits are translated into 15 8-byte blocks or 8 16-byte blocks of) the reader reads a '1'.

Alternatively, each bit in the string to embed 40 (FIG. 1) is translated into a block of data 500 bits long according to the following rule:

if $B_1=1$, then translate $B_i$ into a block of data of a first type, whereby the first 250 bits of the block of data 500 bits long are all 0s (zeroes) and the second 500 bits are randomly determined; and if $B_i=0$, then translate $B_i$ into a block of data of a second type whereby the second 250 bits of the block of data 500 bits long are all 0s (zeroes) and the first 250 bits are randomly determined Detection would, correspondingly be by detecting a block of 250 zeros, and so forth, mutatis mutandis, as described above.

In certain circumstances the general watermarking method disclosed above can be enhanced to a method that is robust to re-encoding of the content. That is, even if the content is re-encoded the reader of the watermark will be able to extract the embedded watermark, at least with noticeable probability of success.

Those skilled in the art will appreciate that the method and system described herein above is presented in a basic form. The method and system described herein above is modifiable in order to make the method and system described herein above more secure against potential attempts at circumvention.

One potential way of modifying the present invention as an attempt to make the present invention more secure against potential attempts at circumvention entails dividing the watermark strings into blocks ten times the length of the input block size of the block cipher being utilized. For example and without limiting the generality of the foregoing, if the input block size of the block cipher being utilized is 128 bits, then, for instance, nine 128 bit blocks may be encrypted using the block cipher, but the tenth block of 128 bits may be encrypted by an alternative method. For instance, and without limiting the generality of the foregoing, the tenth block of 128 bits may be encrypted as follows: compute a 128 bit string produced by a successive XOR'ing of the bits in the first nine 128 bit blocks. The resultant 128 bit string can then be XOR'ed with the tenth 128 bit block, thereby producing an encrypted 128 bit block.

Accordingly, with nine 128 bit blocks encoded according to a first encryption method, and a tenth 128 bit blocks encoded according to a different encryption method, the ten blocks can be arranged in various patterns which make tampering on the basis of the detection of a pattern of repeated blocks more difficult.

Alternatively, various statistical methods implemented by the embedder 50 (FIG. 1) may be used to determine the nature of the watermark. The statistically determined watermark may then be embedded in the content in such a fashion as to require altering a sufficient quantity of bits such that quality of the content would suffer as a result of such an alteration. A content rendering device may then detect results of the statistical methods.

Consider an MPEG packet. The packet has a header, an adaptation field, and a remaining ~160 bytes of payload. Note that the MPEG packets referred herein are transport packets with 160 payload bytes or more. Packets with less than 160 payload bytes the value given to byte A (referred to below) is 0. Such packets do not participate in the embedding of the watermark and extraction thereof. Such packets do not contain an "x_block" (referred to below), encrypted as explained below.

The 160 payload bytes are broke into 10 blocks of 16 bytes each, $b_0$-$b_8$, and $b_x$.

Watermarking begins by the following XOR:

$$b_0 \oplus b_1 \oplus b_2 \oplus b_3 \oplus b_4 \oplus b_5 \oplus b_6 \oplus b_7 \oplus b_8 = B$$

(note that the discussion centers on the plain text values of $b_n$.)

One byte, referred to hereinafter as A, in the adaptation field comprises proprietary parameters. The proprietary parameters are, for the purposes of this discussion not defined, except to say that they are algorithm, implementation, and optimization dependent. However, if A=0, then the packet is not subject to the watermarking scheme described herein.

Now, a function $f(b_x, B, A)$ operates on the three parameters:

$b_x$=the tenth 16 byte payload block in a given MPEG packet. $b_x$ is a 16 byte long vector consisting of payload data;

B=the XOR calculated as mentioned above, of the first nine 16 byte payload blocks in the given MPEG packet; and A=the one byte from the MPEG adaptation field, referred to above.

A random value, k is chosen, such that $k \in \{1 \ldots 32\}$, in other words, an attempt is made to embed the value of the $k^{th}$ watermark bit. The $k^{th}$ bit of $b_x$ is then selected.

The function $f(B, b_x, A)$ may comprise the same encryption function used to encrypt of the rest of the content. Call an encryption function E, the value B will be used as the key and the plain block $b_x$ is modified to $b'_x$ as follows:

Let $b_x=(b_x[0], \ldots, b_x[15])$ then $b'_x=(b_x[0] \oplus A, \ldots, b_x[15])$ and $f(B, b_x, A)=E_B(b'_x)$.

It is desired to encrypt $b_x$ such that the encrypted value of $b_x$ contains information about the watermark $k^{th}$ bit. To encrypt $b_x$ such that the encrypted value of $b_x$ contains information about the watermark $k^{th}$ bit it is assumed that there exists a predicate $P_k(Y)$ for Y, a 16 byte long vector. The predicates $P_k(Y)$ may be secret or vary upon content. For every possible value for k there exists a different predicate.

Set A=1 and N=0, where N is a counter which is incremented upon each reentry to the loop (loop counter), and start the following loop:

Calculate $Y=f(b_x, B, A)$–Y is a 16 byte long vector, calculate $P_k(Y)$ and check if $P_k(Y)$=The $k^{th}$ bit of the watermark.

If $P_k(Y)$ does equal the $k^{th}$ bit of the watermark, then set Y to be the encrypted value of $b_x$. Exit the loop and continue with the next transport packet.

If $P_k(Y)$ does not equal the $k^{th}$ bit of the watermark, then:
  if N+1 has reached a predetermined upper bound, the stop the loop and set A=0. Thus, the transport packet does not participate in the watermarking process and begin processing the next transport packet. In such a case, the block in question may be encrypted using a standard video encryption scheme.
  if N is still smaller than the predetermined upper bound, then set A to a new value (e.g. A=A+1) and reenter the loop trying a new value for A.

Note that the predicates $P_k(Y)$ may comprise a linear combination of the bits of Y for different value of k implies different coefficients for the linear combination.

Detection or extraction of the watermark is performed as follows:

Provide 32 counters that are set to 0 at the start of detection or extraction.

Let $\{C_k\}$ $0<=k<32$. When a transport packet arrives, determine whether the parameter A equals 0 or not. If A=0, then discard the present transport packet. If A does not equal 0, examine the encrypted value of the X_block-$b_x$, a 16 byte value denoted $c_x$. For every k, $0<=k<32$ calculate $P_k(c_x)$ if $P_k(c_x)$ is 1, then increment $C_k$. If $P_k(c_x)$ is 0, then decrement $C_k$.

Continue to determine the value of the parameter A for 30-60 seconds of content material data. If the content is watermarked, then with high probability the absolute value of the all the counters $C_k$ should be higher than a given threshold.

In such a case the watermark sequence is determined by the signs of the counters $C_k$. Otherwise, if the absolute value of the all the counters $C_k$ are not higher than the given threshold, either act as if there is no watermark in the content or as if there was a watermark but the watermark was corrupted.

When decrypting the watermarked content, the transport packet comprising the watermark would first need to have the watermark removed, by:
  decrypting the first 144 bytes (i.e. recovering $b_0$-$b_8$);
  determining the value of B, as described above; and
  using B to decrypt $b'_x$, by performing $b'_x[0] \oplus A$, and thereby determine $b_x$.

It is appreciated that other variant and alternative schemes are also possible. For instance, rather than xor'ing A with $b_x$ in order to encrypt and xor'ing A with $b'_x$ in order to decrypt, A may be xor'ed with an encryption/decryption key. In such a case, let $b_x=(b_x[0], \ldots, b_x[15])$ and $f(B \oplus A, b_x)=E_B(b'_x)$. Accordingly, there is no need to xor A to the first byte of b' when decrypting.

Figure 8:
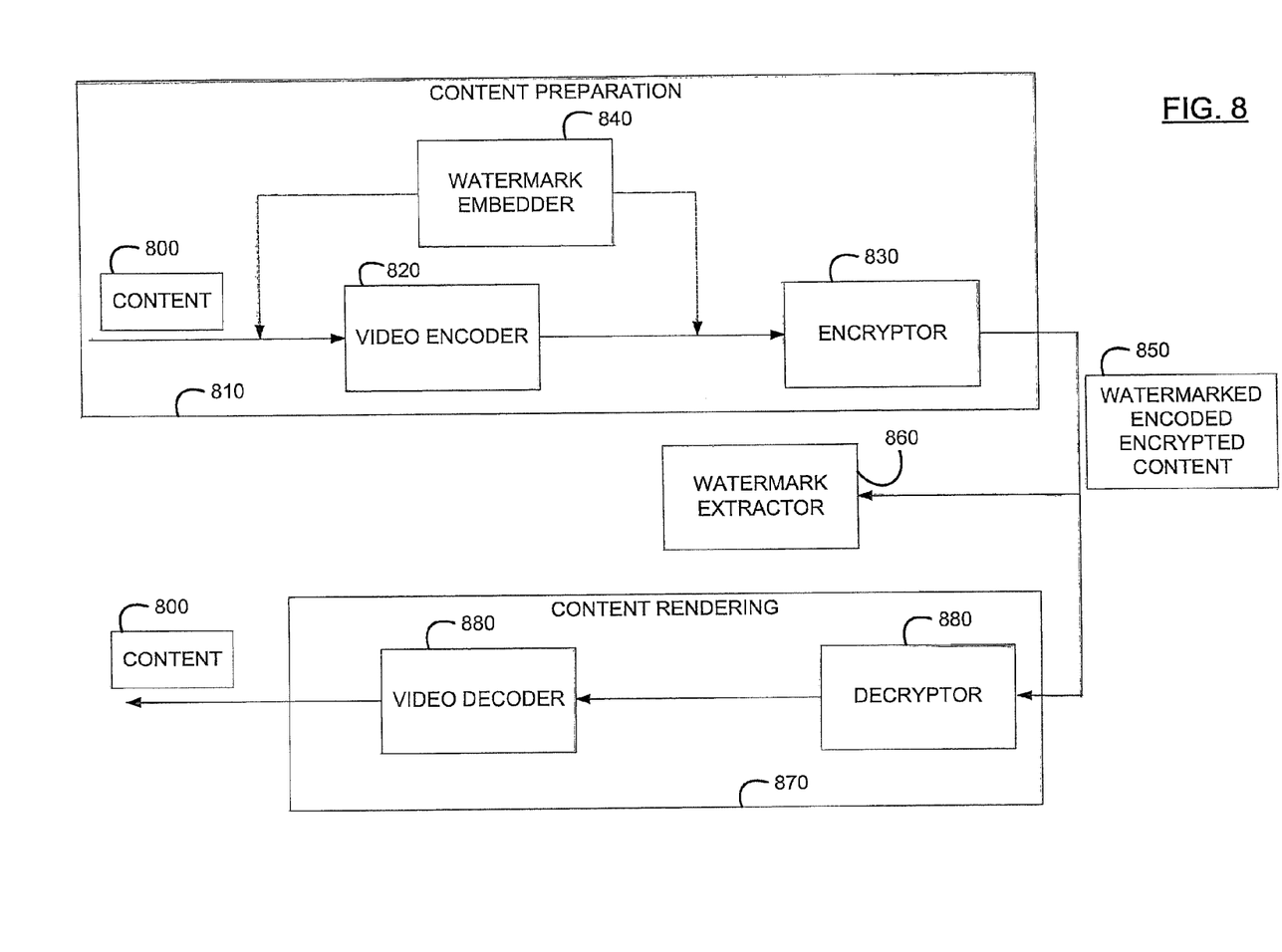
FIG. 8 is a simplified block diagram illustration of a system for embedding and detecting the robust watermark of FIG. 1 in the content item.

Reference is now made to FIG. 8, which is a simplified block diagram illustration of a system for embedding and detecting the robust watermark of FIG. 1 in the content item. The content item 800 is depicted in FIG. 8 as already being present in a content preparation system 810. The content is input into a video encoder 820. Either prior to video encoding at the video encoder 820 or prior to encrypting at a decryptor 840, the content item 800 is watermarked, as described herein above at a watermark embedder 840. The content preparation system 810 thereupon outputs watermarked encoded encrypted content 850. A watermark extractor 860, equipped and operative to extract the watermark using techniques described above can be used to determine the data for embedding 20 (FIG. 1). The watermarked encoded encrypted content 850 may be input to a content rendering device 870. The content rendering device 870 comprises a standard video decryptor 880 and a standard video decoder 890 as is well known in the art. The content rendering device 870 outputs the content 800.

Figure 9:
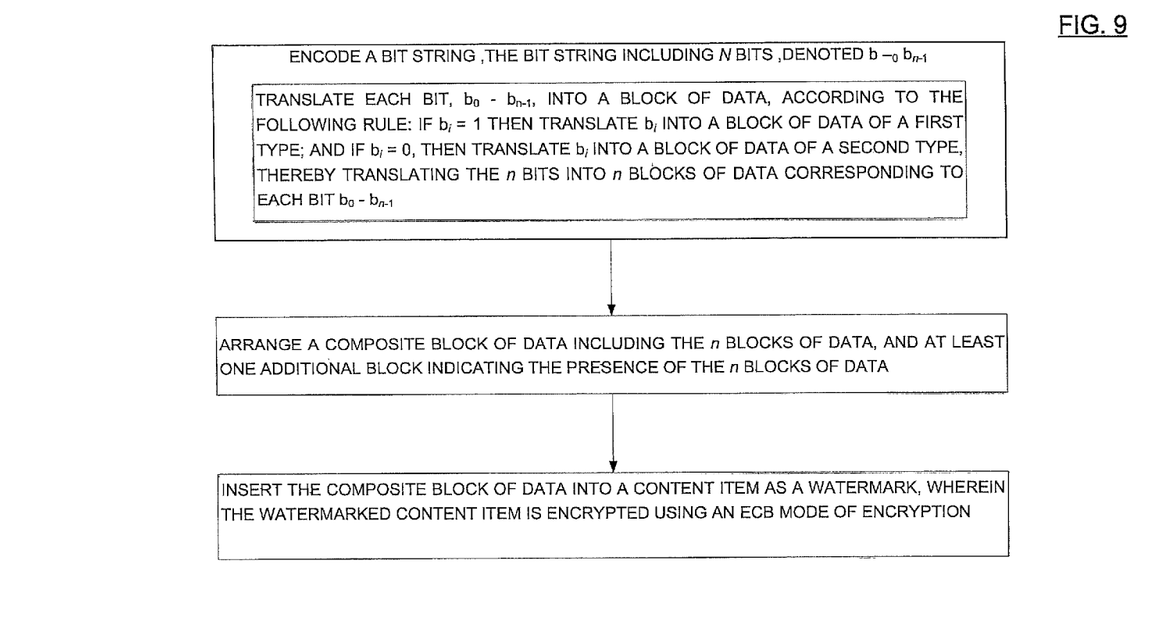
FIGS. 9-11 are simplified flowcharts of preferred methods of operation of the system of FIG. 1.
Figure 10:
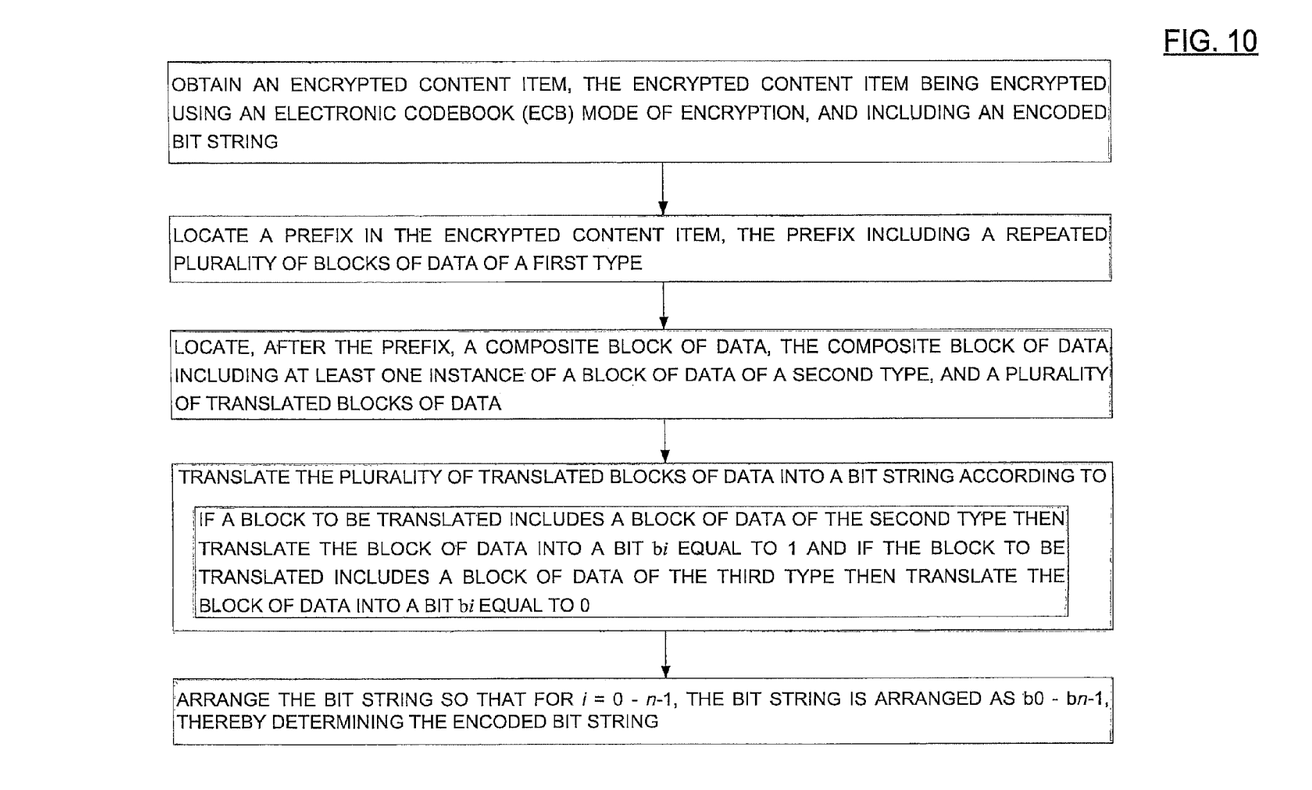
Figure 11:
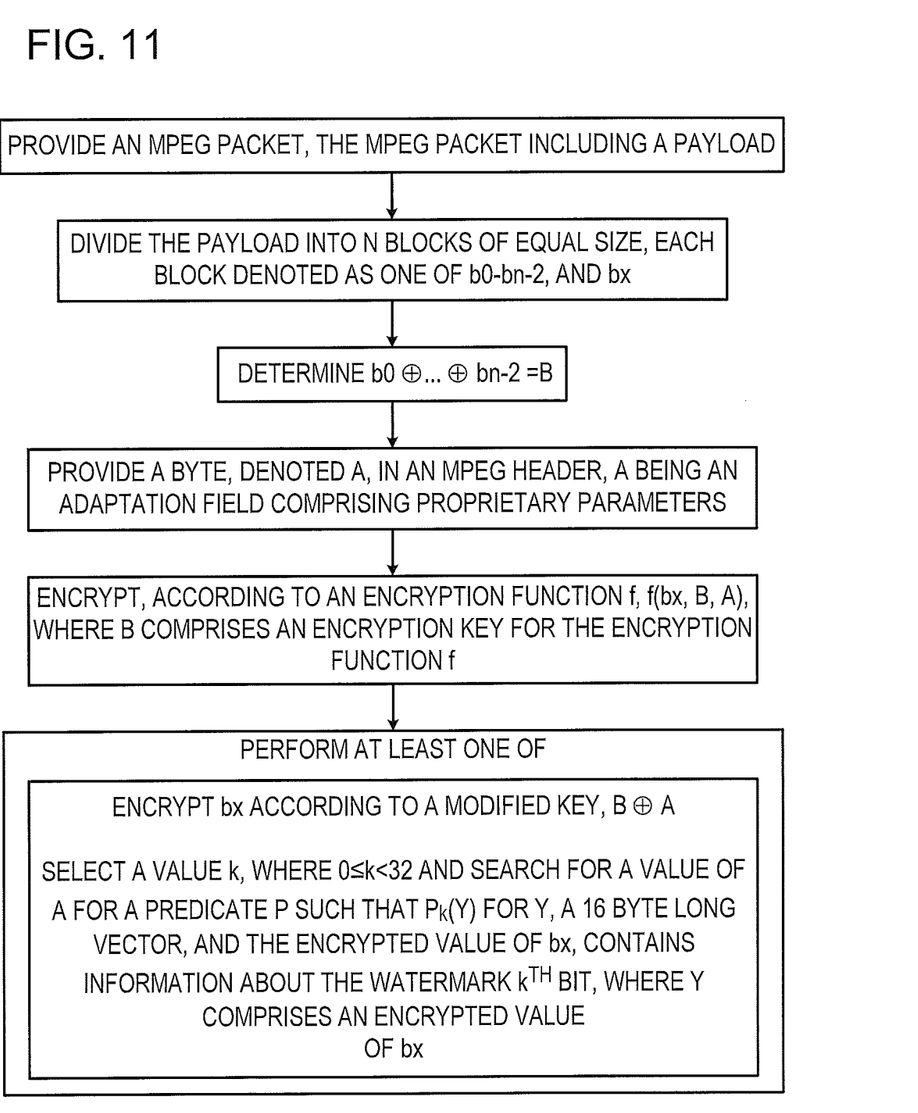

Reference is now made to FIGS. 9-11, which are simplified flowcharts of preferred methods of operation of the system of FIG. 1. FIGS. 9-11 are believed to be self-explanatory in light of the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for embedding a watermark in block encrypted content, the method comprising:
  providing an MPEG packet, the MPEG packet comprising a payload;
  dividing the payload into N blocks of equal size, each block denoted as one of $b_0$-$b_{n-2}$ and $b_x$;
  determining $b_0 \oplus \ldots \oplus b_{n-2} = B$
  providing a byte, denoted A, in an MPEG header, A being an adaptation field comprising proprietary parameters;
  encrypting, according to an encryption function f, $f(b_x, B, A)$, where an encryption key for the encryption function f comprises $g(A,B)$;
  selecting a value k, where $0<=k<32$; and
  calculating $Y=f(bx, B, A)$, Y being a 16 byte long vector;
  calculate $P_k(Y)$;
  determine if $P_k(Y)$=the $k^{th}$ bit of the watermark;
  if $P_k(Y)$=the $k^{th}$ bit of the watermark then continuing to a next MPEG packet;
  if $P_k(Y)$ does not equal the $k^{th}$ bit of the watermark, then increment A and repeat the above procedure until one of:
    $P_k(Y)$=the $k^{th}$ bit of the watermark; and
    a predetermined upper bound is reached, in which case, the provided MPEG packet does not participate in the watermarking process.

2. The method according to claim 1 and wherein Y is calculated as follows:
  setting A=1, and incrementally performing:
    performing the following steps in a loop:
      determining $Y=f(b_x, B, A)$;
      determining if $P_k(Y)$=the $k^{th}$ bit of the watermark;
        if $P_k(Y)$=the $k^{th}$ bit of the watermark then setting Y=an encrypted value of $b_x$;
        if $P_k(Y)$ !=the $k^{th}$ bit of the watermark then:
          if a loop index has exceeded a predetermined upper bound, setting A=0; and stopping the loop and processing another MPEG packet; and
          if the loop index has not exceeded a predetermined upper bound, incrementing A and repeating the determining of Y in the loop.

3. The method according to claim 1 wherein the predicate P comprises a secret value.

4. The method according to claim 1 wherein the predicate P comprises a content dependent predicate.

5. The method according to claim 1 and wherein when $A=0$, utilizing regular encryption.

6. A system for embedding a watermark in block encrypted content, the system comprising:
- an MPEG packet comprising a payload;
- the payload being divided into N blocks of equal size, each block denoted as one of $b_0$-$b_{n-2}$, and $b_x$;
- a processor which determines $b_0 \oplus \ldots \oplus b_{n-2} = B$
- a byte, denoted A, in an MPEG header, A being an adaptation field comprising proprietary parameters;
- an encryption function f, operative to encrypt according to $f(b_x, B, A)$, where an encryption key for the encryption function f comprises $g(A,B)$;
- wherein at least one of the following is performed during encryption:
  - a value k, where $0<=k<32$ is selected;
  - $Y=f(bx, B, A)$ is calculated, Y being a 16 byte long vector;
  - $P_k(Y)$ is calculated;
  - determine if $P_k(Y)$=the $k^{th}$ bit of the watermark,
  - if $P_k(Y)$=the $k^{th}$ bit of the watermark then continue to a next MPEG packet;
  - if $P_k(Y)$ does not equal the $k^{th}$ bit of the watermark then increment A and repeat the above procedure until one of:
    - $P_k(Y)$=the $k^{th}$ bit of the watermark; and
    - a predetermined upper bound is reached, in which case, the provided MPEG packet does not participate in the watermarking process.

7. The method according to claim 1 wherein the function g(A,B) comprising the encryption key is $g(A,B)=A \oplus B$.

8. The method according to claim 1 wherein the function g(A,B) comprising the encryption key is $g(A,B)=A \oplus b_x$.

\* \* \* \* \*